United States Patent [19]

Rapson et al.

[11] Patent Number: 4,534,952
[45] Date of Patent: Aug. 13, 1985

[54] SMALL SCALE GENERATION OF CHLORINE DIOXIDE FOR WATER TREATMENT

[75] Inventors: W. Howard Rapson, Toronto; Maurice C. J. Fredette, Mississauga, both of Canada

[73] Assignee: ERCO Industries Limited, Islington, Canada

[21] Appl. No.: 583,438

[22] Filed: Feb. 24, 1984

[51] Int. Cl.³ ............................................. C01B 11/02
[52] U.S. Cl. .................................. 423/478; 423/477; 210/753; 210/754
[58] Field of Search ................. 210/753–756, 210/758; 423/477, 478

[56] References Cited

U.S. PATENT DOCUMENTS

| | | | |
|---|---|---|---|
| 3,386,915 | 6/1968 | Rutschi et al. | 210/754 |
| 3,900,555 | 8/1975 | Jourdan-Laforte | 423/513 |
| 3,975,284 | 8/1976 | Lambert | 210/754 |
| 4,013,761 | 3/1977 | Ward et al. | 210/754 |
| 4,085,106 | 4/1978 | Janjuer et al. | 423/531 |
| 4,277,531 | 1/1981 | Hicks | 210/754 |
| 4,370,305 | 1/1983 | Affonso | 210/753 |
| 4,414,193 | 11/1983 | Fredette et al. | 423/478 |

Primary Examiner—Gary P. Straub
Assistant Examiner—Jackson Leeds
Attorney, Agent, or Firm—Sim & McBurney

[57] ABSTRACT

Chlorine dioxide, particularly for water treatment but useful in other applications of chlorine dioxide, such as the bleaching of pulp, is produced in an enclosed reaction zone filled with chlorine dioxide-generating reaction medium under sufficient pressure to prevent chlorine dioxide from forming a continuous gaseous phase and the resulting aqueous solution of chlorine dioxide in spent reaction medium is discharged to a recipient aqueous medium, such as a flowing water body to be treated, without the formation of gaseous phase chlorine dioxide.

11 Claims, 3 Drawing Figures

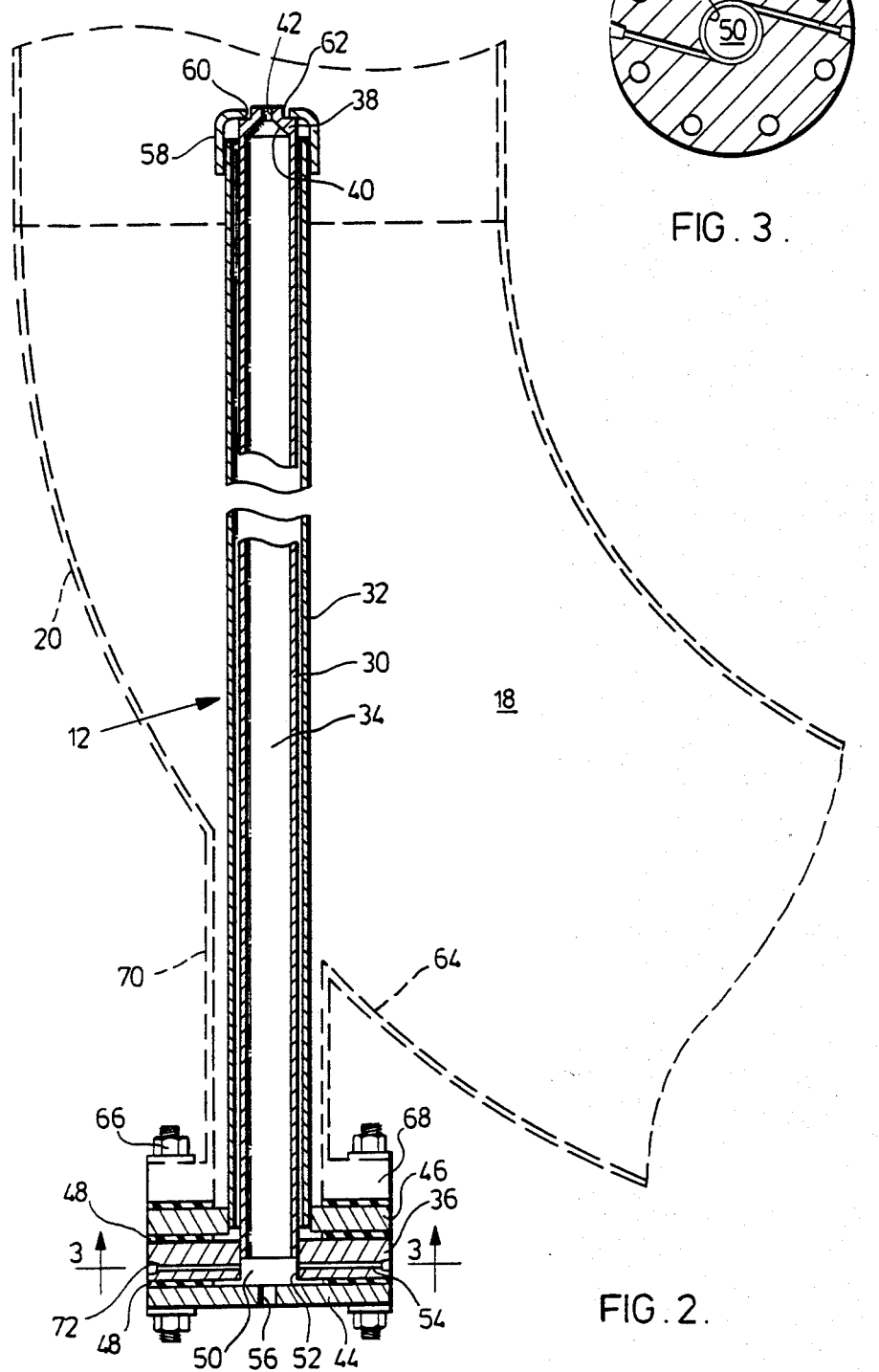

SMALL SCALE GENERATION OF CHLORINE DIOXIDE FOR WATER TREATMENT

FIELD OF INVENTION

The present invention relates to the production of chlorine dioxide and the use thereof in the treatment of water, bleaching of pulp or other applications wherein chlorine dioxide is useful.

BACKGROUND OF THE INVENTION

The use of chlorine dioxide in the treatment of water for disinfection and removal of oxidizable species, such as carbonaceous and sulphurous materials, is well known and is known to have advantages over the use of chlorine. For example, chlorine dioxide avoids the formation of chlorinated end products which are mutagenic and chlorine dioxide is capable of eliminating chlorinated phenolic tastes. Relatively small quantities of chlorine dioxide are required in such use, typically 500 to 2000 lbs/day in a municipal sewage treatment plant of a medium-sized community.

Usually, chlorine dioxide is formed in a reaction zone from chlorine dioxide-generating reactants in an aqueous acid reaction medium and is removed from the reaction zone in a gaseous product stream in which the partial pressure of chlorine dioxide is maintained sufficiently low to prevent decomposition of the chlorine dioxide. The chlorine dioxide gas then is dissolved in water for later use or directly in the water to be treated by the chlorine dioxide. In addition to producing gaseous products of reaction, which must be processed to an aqueous solution form, previous efforts at producing chlorine dioxide in a small compact unit with high yield, short residence time and high production rates have failed, mainly as a result of slow or incomplete reaction.

SUMMARY OF INVENTION

In accordance with the present invention, the chlorine dioxide-producing reaction medium fills the reaction zone and sufficient pressure is applied to maintain potentially gaseous products of reaction, including chlorine dioxide, dissolved in the aqueous phase, so that no continuous gaseous product phase is formed. Upon discharge of the aqueous solution of chlorine dioxide in spent reaction medium to recipient aqueous medium, such as a flowing body of water, the chlorine dioxide remains dissolved in the aqueous phase. It is unnecessary, therefore, to provide a diluent gas and gaseous phase handling and processing equipment. While the invention has particular application to the treatment of water by chlorine dioxide and is specifically described with reference thereto, the chlorine dioxide produced using the process of the invention may be used for other known applications of chlorine dioxide including the bleaching of pulp.

By utilizing this process, it is possible to achieve high yield and high production rate and thereby overcome the prior art problems noted above, particularly when the chlorine dioxide-generating reactants are sodium chlorate, sodium chloride and sulphuric acid. It has been found, in accordance with one particularly-preferred embodiment of the invention, that substantially all the sodium chlorate can be reacted at a high yield in excess of 85% by using reactant feed rates which result in a reaction medium containing about 0.8 to 1 molar sodium chlorate, about 0.8 to 1 molar sodium chloride and about 15 to 16 normal sulphuric acid, a residence time of about 25 to about 150 seconds or longer and a pressure of about 60 to about 80 psig to maintain the chlorine dioxide and chlorine dissolved in the aqueous phase. The reactions which occur in the reaction zone and the enclosed nature of the equipment which is employed do not permit direct measurement of the actual concentrations of reactants in the reaction medium. The concentration values for the reactants recited in this paragraph and elsewhere in this disclosure are calculated from feed concentrations after mixing and before reaction, and from product yield.

In accordance with another preferred embodiment of the invention, chlorine dioxide is formed from a reaction medium containing about 0.8 to 1 molar sodium chlorate and about 4 to 6 normal hydrochloric acid, a residence time of about 20 to about 200 seconds or longer and a pressure of about 60 to about 80 psig to maintain the chlorine dioxide and chlorine dissolved in the aqueous phase.

In a yet further preferred embodiment of the invention, the reaction medium contains about 0.8 to about 1 molar sodium chlorite and about 0.01 to 0.1 normal hydrochloric acid, a residence time of about 20 to about 200 seconds or longer and a pressure of about 60 to about 80 psig.

In the present invention, the aqueous solution of chlorine dioxide in spent reaction products can be conveniently discharged directly into a body of water to be treated, or otherwise employed. This solution contains residual sulphuric acid and sodium salts, but the concentrations are insufficient to cause concern in water treatment for potable use. However, it is important to achieve substantial decomposition of the sodium chlorate reactant before discharge, in view of the known toxicological problems of this substance in water.

GENERAL DESCRIPTION OF INVENTION

In the process of the present invention, chlorine dioxide-producing reactants are fed to an enclosed reaction zone. At least one of the reactants is fed to the reaction zone in the form of an aqueous solution thereof, to provide an aqueous reaction medium filling the reaction zone.

One reactant should be sodium chlorate, sodium chlorite or both. The sodium chlorate and/or sodium chlorite is reacted with at least one other reactant fed to the reaction zone to form chlorine dioxide, with or without chlorine. In general, one reactant may contain sodium chlorate and any suitable reducing agent while the other reactant may be any strong acid, such as, hydrochloric acid, sulphuric acid or phosphoric acid. Combinations of suitable reactants which may be used in this invention include sodium chlorate, sodium chloride and sulphuric acid; sodium chlorate and hydrochloric acid; sodium chlorate, sodium chlorite, sodium chloride and sulphuric acid; sodium chlorate, sodium chlorite and hydrochloric acid; sodium chlorate, sulphur dioxide and sulphuric acid; sodium chlorate, methanol and sulphuric acid; sodium chlorite and chlorine, in gaseous or aqueous solution form; sodium chlorite and hydrochloric acid, sulphuric acid or other strong acid; sodium chlorite, suitable oxidizing agent and sulphuric acid; sodium chlorate, sodium chloride, hydrogen peroxide and/or methanol and sulphuric acid; sodium chlorite, sodium hypochlorite and hydrochloric acid and/or sulphuric acid; and sodium chlorate, glucose and sulphuric acid. Phosphoric acid may be used as partial or complete substitute for sulphuric acid.

In many chlorine dioxide-generating processes, chlorine is coproduced with chlorine dioxide. If desired, the chlorine may be reduced to chloride form by addition of a suitable reagent, such as, hydrogen peroxide, to the reaction product solution before use thereof.

The reactants may be fed to the reaction zone in any convenient manner to achieve rapid intermixing of the reactants. In one embodiment of the invention, a first aqueous reactant stream is fed under pressure in a pipeline conveyor to and through a venturi or constricted throat. A second reactant stream enters the centre of the venturi under the influence of the suction induced by the flow of the first aqueous reactant through the venturi. The second reactant stream may be a further aqueous solution, or may be a gaseous reactant. The turbulence in the venturi throat mixes the reactants thoroughly and rapidly. Under the influence of the pressure in the pipeline, the chlorine dioxide and other potentially gaseous reaction products, including chlorine, remain in the aqueous phase. The resulting aqueous solution of chlorine dioxide in spent reaction medium may conveniently be forwarded to a rapidly flowing, much larger stream of water to be treated, the chlorine dioxide remaining dissolved in the aqueous phase and disinfecting or otherwise treating the water stream. The aqueous chlorine dioxide solution in spent reaction medium may be discharged to the water stream being treated through a back-pressure control valve which prevents the flow of water back into the chlorine dioxide solution stream.

In another embodiment of the invention, the reactant streams are fed to a feed tee located at one end of a pipe reactor. The feed tee is equipped with inlet nozzles which promote mixing of the reactants prior to entering the pipe reactor. The reactants are maintained under pressure in the pipe reactor, so that gaseous chlorine dioxide, and possibly gaseous chlorine depending on the reactants, remains dissolved in the aqueous phase and a continuous gaseous phase is not formed. At the other end of the reactor, the aqueous solution of chlorine dioxide may be diluted before discharge to a storage tank at atmospheric pressure for later use.

Since the formation of a continuous gaseous chlorine dioxide phase is avoided in this invention, there is no necessity for the provision of a source of diluent gas to maintain the partial pressure of gaseous chlorine dioxide below decomposition values. Further, there is no requirement for separate hardware to effect dissolution of the gaseous chlorine dioxide for its subsequent use. In the present invention, the pressurized aqueous chlorine dioxide solution which results from the reaction should be used in a manner which avoids the formation of an undiluted gas phase to prevent explosion.

The equipment which is required in this invention is simple in construction and requires little capital. The process is ideally suited to produce chlorine dioxide in quantities suitable for disinfection and other treatment of water.

BRIEF DESCRIPTION OF DRAWINGS

FIG. 2 is a longitudinal sectional view of a chlorine dioxide producing apparatus utilized in the process of FIG. 1; and FIG. 3 is a sectional view taken on line 3—3 of FIG. 2.

DESCRIPTION OF PREFERRED EMBODIMENT

Figure 1:
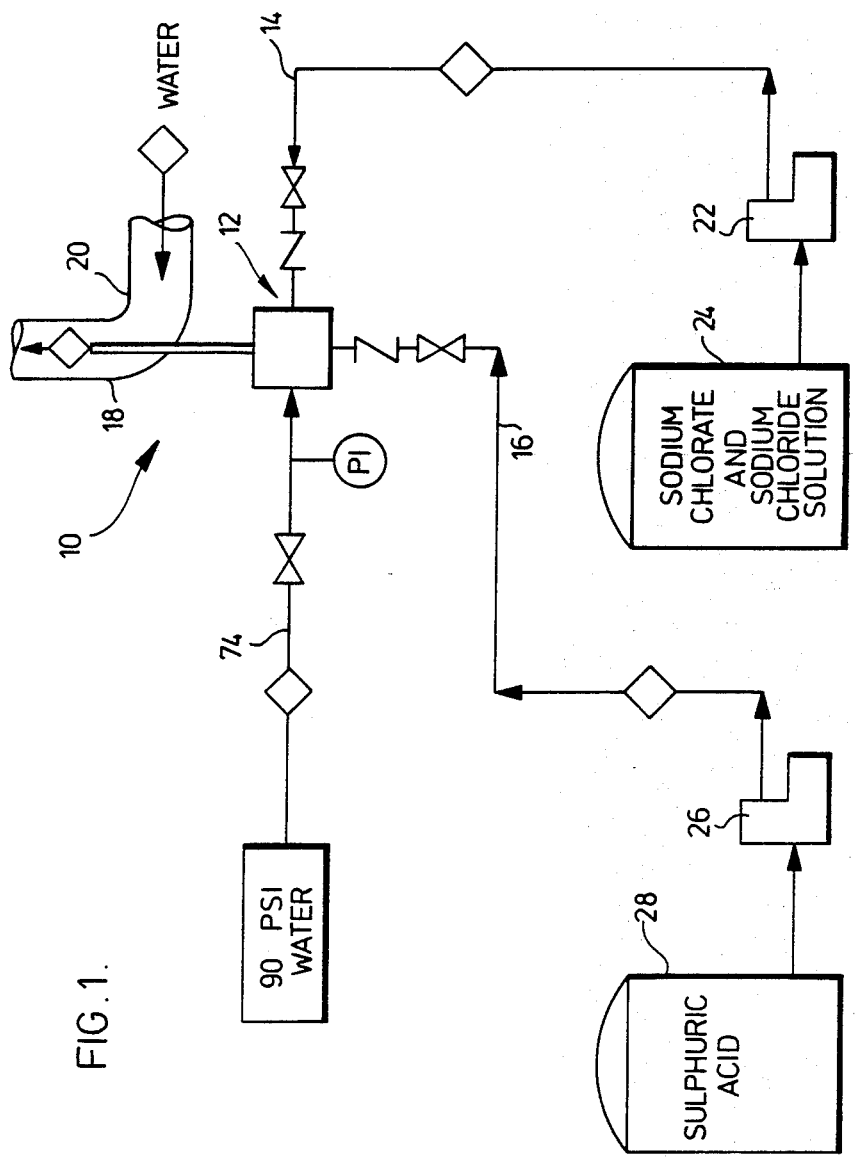
FIG. 1 is a schematic representation of a flow sheet for a process of water treatment using the present invention.

Referring to the drawings, a water treatment operation 10 utilizes a chlorine dioxide-producing apparatus 12, shown schematically in FIG. 1 and described in more detail below with respect to FIGS. 2 and 3, which receives reactant solutions by lines 14 and 16 and which discharges chlorine dioxide in aqueous solution form to a body of water 18 being treated and flowing through pipe 20.

In the specific process illustrated in FIG. 1, the reactant solution in line 14 is an aqueous solution of sodium chlorate and sodium chloride while the reactant solution in line 16 is sulphuric acid. It will be apparent from the above discussion of the invention that other combinations of reactants may be used.

The aqueous solution of sodium chlorate and sodium chloride in line 14 is pumped to the generator 12 by a suitable metering pump 22 communicating with a storage tank 24 containing the solution. The concentration of sodium chlorate and sodium chloride in the aqueous feed solution may vary from about 1 to about 2.5 molar each, typically about 2 molar, usually in molar proportions of sodium chlorate to sodium chloride of about 0.9:1 to about 0.95:1, corresponding to a chloride ion to chlorate ion ratio of about 1:1.05.

The sulphuric acid in line 16 is pumped to the generator 12 by a suitable metering pump 26 communicating with a storage tank 28. The sulphuric acid feed solution usually has a high titratable acid normality in the range of about 20 to about 36 normal, typically about 30 normal.

The aqueous solution of sodium chlorate and sodium chloride and the sulphuric acid are pumped to the generator 12 to provide, in the generator 12, a highly acidic reaction medium which is capable of rapid generation of chlorine dioxide and chlorine. The titratable acid normality of the reaction medium after mixing usually is in the range from about 8 to about 16 normal, preferably about 15 to 16 normal. The calculated concentration of sodium chlorate and sodium chloride in the highly acidic reaction medium usually vary from about 0.5 to about 1.2 molar each, preferably about 0.8 to about 1 molar.

As a result of the highly concentrated nature of the sulphuric acid which is fed to the generator 12 and the rapid dilution thereof upon mixing with the sodium chlorate and sodium chloride solution, the heat of dilution generated thereby results in a reaction medium usually having a temperature in the range of about 30° to about 50° C., preferably about 35° to about 45° C. It will be obvious to those skilled in the art that higher temperatures may be used if corresponding higher pressures are used to maintain the chlorine dioxide dissolved.

The highly acid reaction medium fills the generator 12 and is subjected to pressure therein to substantially prevent the formation of a continuous phase of gaseous chlorine dioxide and chlorine and substantially retain those gases in the dissolved state in the reaction medium. Usually, the pressure is maintained at about 60 to about 90 psig, preferably about 70 to about 80 psig, in the generator 12.

The pressurized solution of chlorine dioxide and chlorine in spent reaction medium is discharged from the generator to the water 18 flowing in pipe 20 after a residence time at least sufficient to effect substantially complete reaction of the sodium chlorate, usually about 12 to about 300 seconds, preferably about 25 to about 150 seconds, although longer residence times may be employed, if desired.

The discharge of the chlorine dioxide and chlorine solution into the body of water 18 achieves substantial dilution of the chlorine dioxide and chlorine, so that the gases remain dissolved and effect the desired treatment of the water in the pipe 20. Usually, the chlorine dioxide-containing solution is diluted about 10 to about 30 times, typically about twenty times.

Details of construction of the chlorine dioxide generator 12 are shown in FIGS. 2 and 3, to which reference now is made. The chlorine dioxide generator comprises a pair of concentrically-arranged tubes 30 and 32. The inner tube 30 is constructed of corrosion-resistant material, typically a corrosion-resistant polymeric material, and the outer tube 32 is constructed of rigid deformation-resistant material, such as stainless steel or similar metal.

The outer rigid tube 32 protects the inner tube 30 from deformation as a result of the flow of the water stream 18 and of the generation of heat of reaction and acid dilution, and hence stabilizes the structure. The corrosion-resistant nature of the inner tube 30 results in a long life of operation in the highly acid environment. If desired, a metal pipe lined with corrosion-resistant material, such as glass, may be used in place of the concentric tubes 30 and 32.

The inner tube 30 defines a reaction chamber 34 for the chlorine dioxide-producing reaction and extends from an annular flange 36 to an outlet member 38 comprising a conical surface 40 converging to a narrow outlet bore 42. Tubes of differing lengths and/or diameters may be used to provide reaction chambers of varying capacity.

In place of the fixed orifice construction of the outlet bore 42, there may be utilized a back-pressure control valve which permits adjustment of the back pressure within the reaction chamber 34 for different production rates. In addition, a pressure operated valve which opens when a predetermined pressure, which may be variably predetermined, is reached in the reaction chamber 34, also may be used as the outlet from the generator 12.

The annular flange 36 and the outlet member 38 are constructed of corrosion-resistant material, typically the same material of construction as the tube 30. The annular flange 36 is sandwiched between an outer closure disc 44 of corrosion-resistant material and a further annular flange 46 to which is affixed one end of the outer tube 32, annular sealing gaskets 48 being provided between abutting surfaces.

A reactant mixing chamber 50 is defined between the central bore 52 of the flange 36 and the end closure disc 44. Two reactant inlet bores 54 and 56 communicate with the reactant feed lines 14 and 16. One inlet bore 54 for sodium chlorate and sodium chloride solution extends through the flange 36 from the external surface thereof to the mixing chamber 50, exiting to the mixing chamber 50 substantially tangential thereto, while the other inlet bore 56 for sulphuric acid extends through the end closure disc 44 axially of the mixing chamber 50, to promote rapid intermixing of reactants fed by the inlet bores 54 and 56 which communicate with the reactant feed lines 14 and 16.

An alternative structure of mixing chamber for the generator 12 involves the use of a venturi which would have one of the reactant feeds, preferably the sodium chlorate and sodium chloride solution, communicating with the convergent pipe of the venturi and the other of the reactant feeds, preferably the sulphuric acid, communicating with the collar of the venturi. The flow of the one reactant then would draw the other reactant into the collar for rapid and intimate mixing.

As mentioned previously, the process of the invention is not limited to the specific combination of reactant feeds mentioned in connection with lines 14 and 16 but rather the invention has general application to any combination of chlorine dioxide-generating reactants. Specific alternate combinations are discussed above.

The outer tube 32 extends from the flange 46 to a cup-like end member 58 which sealingly engages the outer surface of the outlet member 38 against the ingress of the water from the flowing stream 18 to between the inner and outer tubes 30 and 32. The cup-like end member 58 has a central opening 60 through which projects the cylindrical portion 62 of the outlet 38 having the bore 42 therethrough.

The generator 12 is mounted to an elbow 64 of the pipe 20 with the concentric tubes 30 and 32 extending approximately vertically upwardly into the flowing water stream 18 and terminating in a vertical portion of the pipe 20. At the exit of the generator 12, therefore, the flow of chlorine dioxide solution and water to be treated is in the same direction.

While the generator 12 is illustrated as discharging the chlorine dioxide through an elbow in the pipe 20 and in the direction of flow of the water, this arrangement is provided for convenience of assembly and is not critical. The generator 12 may be arranged substantially radially of a straight pipe-section or any other convenient arrangement.

The generator 12 is mounted to the pipe elbow 64 by bolting to an annular flange 68 at the end of a vertical pipe extension 70, with an annular gasket 71 being located between the abutting surfaces of the flanges 46 and 68.

A tangential bore 72 is through the flange 36 in communication with a valved pressurized wash water feed line 74. Normally, the valve in the water feed line 74 is closed, but upon ceasing of chlorine dioxide production as a result of the termination of the flow of reactants to the generator 12, the valve is opened to permit wash water to flow into the mixing chamber 50 and the reaction chamber 34 to flush out spent reaction medium.

OPERATION

In operation, an aqueous solution of sodium chlorate and sodium chloride enters the generator 12 through bore 54 while sulphuric acid enters the generator 12 through bore 56. The reactants rapidly intermix in the mixing chamber 50 and flow through the reaction chamber 34 inside the pipe 30 under the influence of the pressure of flow of reactants to the mixing chamber 50. The reducing diameter of the pipe 30 at the cone 40 terminating in the restricted diameter outlet bore 42, or valved outlet, serves to apply back pressure on the reaction medium in the pipe 30, so as to prevent the formation of a continuous gaseous phase of chlorine dioxide and chlorine and retain those potentially-gaseous products of reaction substantially dissolved in the reaction medium. The resulting aqueous solution of chlorine dioxide and chlorine dissolved in spent reaction medium is discharged through the outlet bore 42 to the flowing water stream 18 and is dissolved and dispersed therein.

The generator 12 is simple in construction, easy to operate and requires no maintenance. Chlorine dioxide can be produced rapidly at high yield and good efficiency as an aqueous solution in spent reaction medium. No gaseous diluents are required and the equipment required for handling gaseous reaction products is eliminated.

EXAMPLES

EXAMPLE 1

An experimental apparatus was set up comprising a Y-joint communicating with the upper end of a capillary tube 140 cm long and 2.5 to 3 mm in diameter. The first 10 cm of the leg of the Y-joint contained constrictions to promote mixing of the reactant streams fed to the arms of the Y-joint. A cooling jacket was provided surrounding the capillary tube. The lower exit of the capillary tube communicated with a tee to which water was fed to dilute the reaction products and remove the diluted solution to a collection jar.

An aqueous solution of sodium chlorate and sodium chloride, pressurized to about 70 psig, was fed to one inlet of the Y-joint while sulphuric acid, also pressured to about 70 psig, was fed to the other inlet of the Y-joint. The reaction medium filled the tube and the formation of a continuous gaseous phase was not observed. A range of concentrations of sodium chlorate, sodium chloride and sulphuric acid, with varying residence times, was tested to attempt to establish conditions which result in reaction of substantially all the chlorate using the least amount of acid. The reactor was cooled to maintain a reaction temperature of about 25° to 30° C.

The results obtained are reproduced in the following Table I:

sodium chlorate and sodium chloride, increasing the acidity in the reaction medium from 9.4 to 13.6 normal and increasing the residence time from 12 to 42 seconds had little effect on the approximately 70% maximum reaction of sodium chlorate. However, by lowering the concentration of the feed solution of sodium chlorate and sodium chloride, so as to provide a chlorate concentration in the reaction medium of about 0.9 to 1 molar, and by increasing the acidity of the reaction medium to about 15 to 16 normal, 96.6% and 98% conversion of sodium chlorate was achieved (runs 6 and 10 respectively). In the case of run 10, the substantially complete reaction of sodium chlorate was achieved at an efficiency of 88% and a yield of 86%.

EXAMPLE 2

A further experimental apparatus was set up comprising a tee communicating with the lower end of a glass tube 30 cm long with an inside diameter of 2.54 cm. Nozzles were installed in the tee to inject reactant feeds into the reactor. A second tee was provided at the upper end of the tube with a diluent water feed line communicating with the tee to contact the reaction products and dilute the same. The exit of the upper tee communicated with a product collection vessel.

An aqueous solution of sodium chlorate and sodium chloride was fed to one inlet to the lower tee while sulphuric acid was fed to the other inlet to the lower tee. In some runs, hydrogen peroxide or methanol also was fed with the sodium chlorate and sodium chloride solution to decrease the quantity of chlorine coproduced with the chlorine dioxide. The flow rates of reactants were such as to produce a pressure in the reaction tube of 65 to 75 psig. In each case, reaction medium filled the tube and the formation of a continuous gaseous phase was not observed.

The results are reproduced in the following Table II

TABLE I

| Run | 1[4] | 2[4] | 2 | 4 | 5 | 6 | 7 | 8 | 9 | 10 | 11 | 12 | 13 |
|---|---|---|---|---|---|---|---|---|---|---|---|---|---|
| Feed $ClO_3^-$ (M) | 3 | 3 | 3 | 3 | 2 | 2.3 | 3 | 3.4 | 2 | 2.1 | 2 | 2 | 1.6 |
| $Cl^-$ (M) | 3 | 3 | 3 | 3 | 2 | 2.3 | 3 | 3.4 | 2 | 2.1 | 2.3 | 2.3 | 1.7 |
| $ClO_3^-$ in reactor (M) | N.D.[1] | N.D. | N.D. | N.D. | N.D. | 1.03 | 1.0 | 1.75 | 1.35 | 1.05 | 0.9 | 0.88 | 1.0 | 0.8 |
| $H^+$ in reaction (N) | 9.4 | 9.4 | 12.9 | 13.6 | 13.6 | 15.7 | 12.1 | 17 | 13.5 | 16 | 15.8 | 14.1 | 14 |
| % $ClO_3^-$ reacted | 56 | 75 | 71 | 70 | 64 | 96.6 | 63 | 58 | 76 | 98 | 74 | 80 | 79 |
| % Efficiency[2] | 68 | 30 | 87.3 | 80.7 | 83.6 | 76 | 59 | 74 | 81 | 87.6 | 64 | 95 | 78 |
| % Yield[3] | 38 | 23 | 62 | 50.5 | 53.7 | 74 | 37 | 43 | 61 | 85.7 | 47 | 76 | 62 |
| Residence Time (secs) | 12 | 20 | 22 | 42 | 27 | 25 | 20 | 26 | 22 | 26 | 11 | 21 | 23 |

Notes:
[1] N.D. means not determined

[2] Efficiency = $\dfrac{ClO_2 \text{ formed}}{ClO_3^- \text{ reacted}}$

[3] Yield = $\dfrac{ClO_2 \text{ formed}}{\text{Total } ClO_3^- \text{ feed}}$

[4] No cooling

It will be seen from the data reproduced in the above Table I that, in the first four runs at a feed of 3 molar

TABLE II

| Run No. | F1 (M) $ClO_3^-$ | $Cl^-$ | $H_2O_2$ | MeOH | F2 (N) $H_2SO_4$ | Feed Rate (ml/min) F1 | F2 | Pressure (psig) | % E | % Y | $H^+$ (N) | % $ClO_3^-$ Reacted |
|---|---|---|---|---|---|---|---|---|---|---|---|---|
| 1. | 2.06 | 2.34 | | | 30 | 28.9 | 37.0 | 65 | 82 | 71.7 | 16.8 | 88 |
| 2. | 2.04 | 2.02 | | | 30 | 40.6 | 19.4 | 75 | 73 | 33.0 | 9.7 | 45 |
| 3. | 3.90 | 1.00 | 1.95 | | 33 | 31.2 | 25.3 | 70 | 96 | 24.9 | 14.8 | 26 |
| 4. | 2.10 | 0.54 | 1.05 | | 33 | 27.4 | 26.7 | 70 | 71 | 35.6 | 16.3 | 50 |
| 5. | 1.86 | 2.10 | 1.05 | | 33 | 20.1 | 28.3 | 70 | 83 | 53.3 | 19.3 | 65 |
| 6. | 2.10 | 2.10 | | | 30 | 29.4 | 33.2 | 70 | 82 | 71.0 | 16.0 | 87 |
| 7. | 1.80 | 1.83 | | | 30 | 28.4 | 29.4 | 70 | 94 | 85.1 | 15.2 | 96 |
| 8. | 1.77 | 1.00 | 0.90 | | 33 | 27.9 | 29.3 | 70 | 79 | 65.2 | 15.4 | 83 |
| 9. | 1.45 | 0.96 | 0.90 | | 33 | 21.1 | 23.5 | 70 | 71 | 64.0 | 17.4 | 91 |

TABLE II-continued

| Run No. | F1 (M) ClO₃⁻ | Cl⁻ | H₂O₂ | MeOH | F2 (N) H₂SO₄ | Feed Rate (ml/min) F1 | F2 | Pressure (psig) | % E | % Y | H⁺ (N) | % ClO₃⁻ Reacted |
|---|---|---|---|---|---|---|---|---|---|---|---|---|
| 10. | 1.26 | 1.24 | 0.62 | | 33 | 23.3 | 23.6 | 70 | 70 | 59.5 | 16.6 | 96 |
| 11. | 1.83 | 0.03 | | 0.72 | 33 | 26.1 | 23.0 | 70 | — | 2.0 | 15.5 | — |
| 12. | 1.86 | 1.90 | | 0.72 | 33 | 22.5 | 22.1 | 70 | 58 | 49.1 | 16.5 | 85 |

Table II provides a ready means of calculating the initial composition at the generator inlet after mixing. In run #1, there is a flow rate of 28.9 ml/min of 2.06M NaClO₃ and 2.34M NaCl and a flow rate of 37 ml/min of 30N H₂SO₄ for a total flow of 65.9 ml/min. The sulphuric acid concentration after mixing is:

$$30N \times \frac{37 \text{ ml/min}}{65.9 \text{ ml/min.}} = 16.8N$$

Similarly for sodium chlorate and sodium chloride, the concentrations are:

$$NaClO_3 - 2.06M \times \frac{28.9 \text{ ml/min}}{64.9 \text{ ml/min}} = 0.90M$$

$$NaCl - 2.34M \times \frac{28.9 \text{ ml/min}}{65.9 \text{ ml/min}} = 1.03M$$

The results of the above Table II generally corroborate those of Table I for feeds of sodium chlorate and sodium chloride. In run 7, 94% efficiency was observed with 96% reaction of sodium chlorate. In runs where hydrogen peroxide was added to the feed yields ranged from 25 to 65%, while methanol yielded similar results.

In another experiment, hydrogen peroxide was added to the product solution resulting from reaction of sodium chlorate, sodium chloride and sulphuric acid in the reactor. It was found that the hydrogen peroxide preferentially reduced the chlorine with little effect on ClO₂, yielding a solution with a ClO₂/Cl₂ ratio of 19:1 w/w, with overall yield near 84%.

EXAMPLE 3

Runs were conducted using the apparatus described in Example 2 for reactant streams comprising sulphuric acid and an aqueous solution of sodium chlorate, sodium chlorite and sodium chloride as the feeds. The reaction medium filled the reactor tube and the formation of a continuous gaseous phase was not observed. The results are set forth in the following Table III:

TABLE III

| Run No. | Feed Composition (M) NaClO₃ | NaClO₂ | NaCl | Feed Rate (moles/hr) NaClO₃ | NaClO₂ | NaCl | H₂SO₄ | H⁺ (N) | Yield | % ClO₃⁻ Reacted |
|---|---|---|---|---|---|---|---|---|---|---|
| 1 | 1.09 | 1.01 | 1.05 | 1.68 | 1.56 | 1.62 | 46.3 | 15 | 85 | 100 |
| 2 | 1.11 | 1.04 | 1.04 | 1.25 | 1.25 | 1.33 | 36.2 | 15 | 88.3 | 92.5 |

As may be seen from the results of the above Table III, moderately good yields can be obtained with substantial reaction of sodium chlorate.

SUMMARY OF DISCLOSURE

In summary of this disclosure, the present invention provides a novel process for forming chlorine dioxide wherein the chlorine dioxide does not form a discrete gaseous phase but rather is retained in solution from formation to use. Modifications are possible within the scope of this invention.

What we claim is:

1. A process for the production of an aqueous solution of chlorine dioxide, which comprises:
   (a) feeding to a reaction zone filled with aqueous reaction medium chlorine dioxide-producing reactants, in the form of (i) an aqueous solution of sodium chlorate and sodium chloride having individual concentrations of from about 1 to about 2.5M in molar proportions of sodium chlorate to sodium chloride of about 0.9:1 to about 0.95:1 and (ii) sulphuric acid having a total acid normality of about 20 to about 36 normal, at flow rates to provide said reaction medium with concentrations of sodium chlorate and sodium chloride of about 0.5 to about 1.2 molar each and a total acid normality of about 8 to about 16 normal;
   (b) subjecting said aqueous reaction medium in said reaction zone to a pressure in the range of about 60 to about 90 psig to maintain potentially gaseous products of reaction, including chlorine dioxide, substantially dissolved in said aqueous reaction medium,
   (c) retaining said reaction medium in said reaction zone for at least about 12 seconds at a temperature of about 30° to about 50° C., and
   (d) discharging the resulting aqueous solution of chlorine dioxide in spent reaction medium from said reaction zone to a recipient aqueous medium to be dissolved therein without the chlorine dioxide assuming a gaseous form.

2. The process of claim 1, wherein the enclosed reaction zone is an elongate tubular reaction zone, said chlorine dioxide-producing reactants are fed to one end of the tubular reaction zone to be intermixed thereat, the intermixed reactants flow through the tubular reaction zone, and the aqueous solution of chlorine dioxide is discharged from the other end of the tubular reaction zone.

3. The process of claim 2, wherein at least one of said reactant streams is fed to a circular mixing zone at said one end of said tubular reaction zone generally tangentially thereof.

4. The process of claim 2 wherein one of said reactant streams is fed to the converging portion of a venturi zone and the other of said reactant streams is fed to the collar portion of a venturi zone.

5. The process of claim 1 wherein said recipient aqueous medium is a flowing body of water.

6. A process for the production of an aqueous solution of chlorine dioxide, which comprises:
   (a) feeding to a reaction zone filled with aqueous reaction medium chlorine dioxide-producing reactants, in the form of (i) an aqueous solution of sodium chlorate and sodium chloride and (ii) sulphuric acid, in concentrations and at flow rates sufficient to provide said reaction medium with concentrations of sodium chlorate and sodium chloride of about 0.8 to 1 molar each and a total acid normality of about 15 to 16 normal, (b) subjecting said aqueous reaction medium in said reaction zone to a pressure in the range of about 60 to about 80 psig to maintain potentially gaseous products of reaction, including chlorine dioxide, substantially dissolved in said aqueous reaction medium, (c) retaining said aqueous medium in said reaction zone for at least about 25 seconds in order to achieve substantial decomposition of said sodium chlorate prior to discharge from said reaction zone, and (d) discharging the resulting aqueous solution of chlorine dioxide in spent reaction medium from said reaction zone to a recipient aqueous medium to be dissolved therein without the chlorine dioxide assuming a gaseous form.

7. The process of claim 6, wherein the enclosed reaction zone is an elongate tubular reaction zone, said chlorine dioxide-producing reactants are fed to one end of the tubular reaction zone to be intermixed thereat, the intermixed reactants flow through the tubular reaction zone, and the aqueous solution of chlorine dioxide is discharged from the other end of the tubular reaction zone.

8. A process for the production of an aqueous solution of chlorine dioxide, which comprises:

(a) feeding to a reaction zone filled with aqueous reaction medium chlorine dioxide-producing reactants, in the form of (i) an aqueous solution of sodium chlorate and (ii) hydrochloric acid, in concentrations and at flow rates sufficient to provide said reaction medium with a concentration of sodium chlorate of about 0.8 to 1 molar and a total acid normality of about 4 to 6 normal, (b) subjecting said aqueous reaction medium in said reaction zone to a pressure in the range of about 60 to about 80 psig to maintain potentially gaseous products of reaction, including chlorine dioxide, substantially dissolved in said aqueous reaction medium, (c) retaining said reaction medium in said reaction zone for at least about 20 seconds in order to achieve substantial decomposition of said sodium chlorate prior to discharge from said reaction zone, and (d) discharging the resulting aqueous solution of chlorine dioxide in spent reaction medium from said reaction zone to a recipient aqueous medium to be dissolved therein without the chlorine dioxide assuming a gaseous form.

9. The process of claim 8, wherein the enclosed reaction zone is an elongate tubular reaction zone, said chlorine dioxide-producing reactants are fed to one end of the tubular reaction zone to be intermixed thereat, the intermixed reactants flow through the tubular reaction zone, and the aqueous solution of chlorine dioxide is discharged from the other end of the tubular reaction zone.

10. A process for the production of chlorine dioxide, which comprises:

(a) feeding to a reaction zone filled with aqueous reaction medium chlorine dioxide-producing reactants, in the form of (i) an aqueous solution of sodium chlorite and (ii) hydrochloric acid, in concentrations and at flow rates sufficient to provide said reaction medium with a concentration of sodium chlorite of about 0.8 to 1 molar and a total acid normality of about 0.01 to 0.1 normal, (b) subjecting said aqueous reaction medium in said reaction zone to a pressure in the range of about 60 to about 80 psig to maintain potentially gaseous products of reaction, including chlorine dioxide, substantially dissolved in said aqueous reaction medium, (c) retaining said aqueous reaction medium in said reaction zone for at least about 20 seconds in order to achieve substantial decomposition of said sodium chlorite prior to discharge from said reaction zone, and (d) discharging the resulting aqueous solution of chlorine dioxide in spent reaction medium from said reaction zone to a recipient aqueous medium to be dissolved therein without the chlorine dioxide assuming a gaseous form.

11. The process of claim 10, wherein the enclosed reaction zone is an elongate tubular reaction zone, said chlorine dioxide-producing reactants are fed to one end of the tubular reaction zone to be intermixed thereat, the intermixed reactants flow through the tubular reaction zone, and the aqueous solution of chlorine dioxide is discharged from the other end of the tubular reaction zone.

* * * * *